May 14, 1957  H. P. WELCH  2,792,318
BIAS CUT SPLICED FABRIC STRIP
Filed Jan. 18, 1951
Fig. 1.
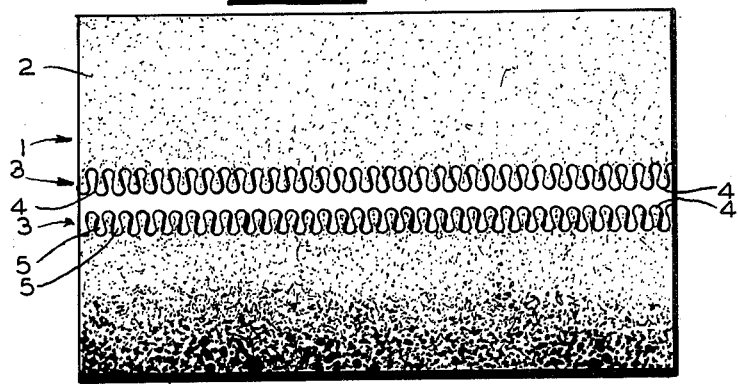
Fig. 2.
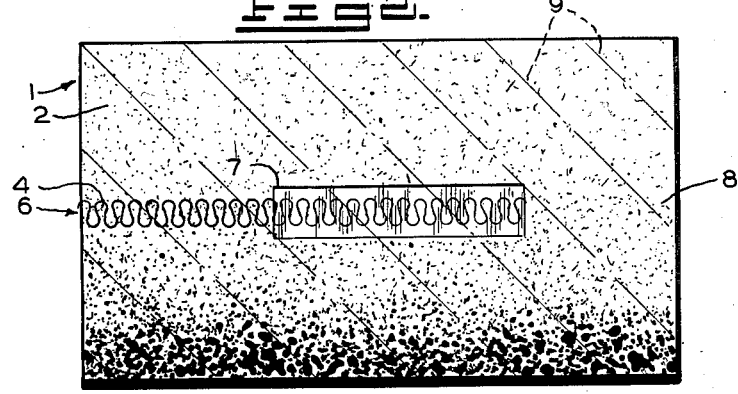
Fig. 3.
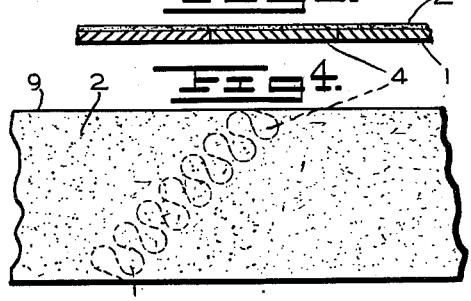
Fig. 4.
Fig. 5.
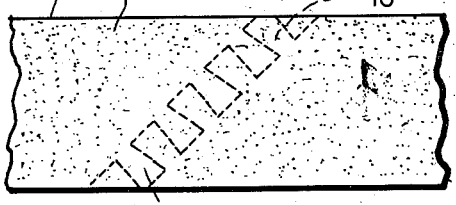
Fig. 6.
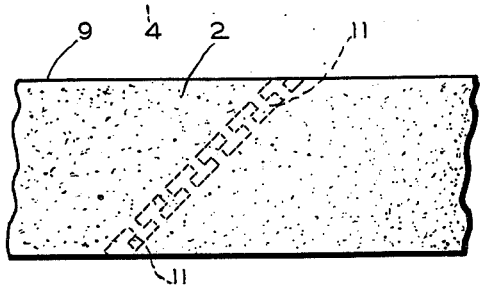
INVENTOR
Herman P. Welch
BY Albert H. Kirchner
ATTORNEY

United States Patent Office 2,792,318
Patented May 14, 1957

2,792,318

BIAS CUT SPLICED FABRIC STRIP

Herman P. Welch, Union City, Ind., assignor to Backstay Welt Company, Union City, Ind., a corporation of Indiana Application January 18, 1951, Serial No. 206,659

2 Claims. (Cl. 154—43)

The present invention relates to splice joints in coated fibrous sheets and strips, especially leather and imitation leather, and its principal object is to provide a joint by which relatively short sections of finished coated material may be joined to form a unitary and apparently integral long strip in which the joints are effectively masked and concealed.

In the art of producing trimming strips for use in making welts, gimps and bindings for automobile body interiors, automobile sun visors, upholstered furniture, automobile fender welts and windlaces, refrigerator door gaskets and a great variety of other objects and articles made of fabric and other materials requiring edge finishing, leather and imitation leather are used. Both of these materials are available in short lengths only, the length of leather being limited by the maximum dimension in which a skin can be cut, and the length of coated textile fabric being limited by the necessity of cutting straight woven yard goods diagonally to produce the bias weave fabric which is required to enable the strip to be turned around short radius curves without kinking or puckering. To avoid expensive waste in applying the finished product or in fabricating the final article, the strip must be made available in rolls or spools of great length; hence the necessity of splicing together a multiplicity of short sections end to end.

Numerous types of joint have been proposed by the prior art, but all of them have proved to be objectionable from the standpoint of appearance because in all of them the connection involves some overlapping or equivalent thickening of the material that makes the joint highly conspicuous.

The principal object of the present invention is to provide an improved joint which will connect sections of the material together in a bond that will have the requisite tensile strength and yet be so well masked as to be entirely inconspicuous, the joint zones presenting an appearance indistinguishable from that of the zones between the joints.

Related objects are to provide a joint having the foregoing advantages which can be made rapidly and inexpensively by automatic machinery.

Broadly speaking, these and other objects and advantages are attained by cutting the ends of the sections of surface finished material to form complemental tongues and grooves of generally dovetail or equivalent shape, then interlocking these ends in the single plane of the material, and finally applying to the zone of the joint the same kind of coating substance that was used as the original finish of the material and graining or otherwise decorating the new coating to match the old.

In the accompanying drawing, which illustrates the invention embodied in certain forms which have been successfully reduced to practice and hence are at present preferred, Figure 1 is a plan view of a sheet of coated square woven textile fabric having its longitudinal edges cut in accordance with one of the tongue and groove formations contemplated by the invention;

Fig. 2 is a similar view showing the tongued and grooved edges interfitted and illustrating three stages of the jointing operation comprising, from left to right, the initial interfitting step, the subsequent coating operation, and the result of the final graining operation;

Fig. 3 is a cross-sectional view taken lengthwise through the joint, and

Figs. 4, 5 and 6 are top plan views, on a somewhat larger scale, of the strip of finished product illustrating three specifically different types of interlocking tongue and groove formations.

Referring to the drawing, the reference numeral 1 designates a portion of a length of square woven yard goods bearing a surface coating 2 grained in simulation of leather. This coating may be any of those lacquers having a cellulose or other base, such as those made from pyroxylin or the like, which are well known and widely used in making coated fabrics by applying them in liquid or plastic condition to suitable base fabric such as woven yard goods and then causing them to harden, with or without graining or other surface decoration treatment. Other coating materials include various resins of the alkyd, phenolic, rubber-base, and polymeric types, including particularly the vinyl compounds.

As shown in Fig. 1, each of the longitudinal edges 3 of the material 1 is cut to provide an identical formation of alternate tongues 4 and accurately complemental grooves 5, so shaped that the outer portions of the tongues are appreciably wider than the inner portions thereof. The converse is necessarily true of the grooves, since they are complemental to the tongues, the inner portions of the grooves being wider than the outer portions thereof.

Fig. 1 shows the fabric 1 disposed in substantially tubular shape with the longitudinal edges 3 juxtaposed and slightly separated. This showing is made simply for the purpose of illustration. The edges are not thus separated during the preferred commercial practice of the invention. In such manufacture the originally straight line edges of the material 1 are overlapped slightly and then both margins are simultaneously cut into the desired tongued and grooved shape, preferably in some continuous operation as by running the overlapped margins between cutting rollers edged appropriately to trim from each margin a narrow strip of waste which leaves the two edges formed as shown in Fig. 1 but interfitted as shown at 6 on the left side of Fig. 2 instead of separated as shown in Fig. 1.

With the edges 3 kept in this interfitted relation, the tubular strip is run through a station or zone, or a successive series of stations or zones, indicated by the numeral 7 in Fig. 2, in which the coating 2 carried by the tongues and the immediately adjacent area of the sheet 1 is softened, additional similar material is applied in soft or liquid form, and the combined old and new coatings are grained in exact simulation of the original graining, thus covering the joint area and completely concealing the lines at which the tongues meet, so as to produce the appearance shown at 8.

The softening of the original coating may be performed by heating (when the coating material is thermoplastic) or by applying a suitable solvent, or in any other way appropriate for the particular coating material. In some cases, as when the original coating is quite thick, it will be found unnecessary to apply additional coating material, but in most cases I prefer to daub new material onto the softened material. This addition does not, as might be supposed, increase the thickness of the coating, but merely compensates for the softened original material which sank into the very narrow space between the interfitted tongues or was absorbed by the cut ends of the threads.

The joint, prepared as just explained, may be dried to solidify the coating by applying such treatment as the particular coating substance may require. Thus, the joint may be heated or warmed to evaporate a solvent, or a current of cool air may be blown onto the material if it is thermoplastic.

The result is a tube of fabric having a length equal to that of the original yard goods and having a longitudinal seam completely covered and masked by a continuous layer of coating which is integral with and hence indistinguishable from the original coating, as indicated by Fig. 3, which may be regarded as a transverse section taken through the zone 8 of Fig. 2.

The finished tube, completed throughout its length as shown at the right hand side of Fig. 2, is then cut spirally along a number of parallel lines indicated by the broken lines 9 in Fig. 2, as disclosed in my copending application Serial No. 175,165, filed July 21, 1950, now Patent No. 2,668,296, issued February 9, 1954. This reduces the tube to flat narrow strip form, producing several such strips side by side. In each strip the threads run on the bias, thus giving the strip the two-way stretch and universal flexibility which enables it to be disposed around curves of short radius without kinking or puckering. The strips are characterized by regularly recurring joints which extend diagonally as shown by the dotted line in Fig. 4 and which are entirely invisible from the top surface of the strip, although being noticeable in the bottom surface.

Fig. 5 shows an alternate type of joint in which the tongues 10 are bounded by straight, outwardly diverging lines so as to have much the shape of the dovetail tongues used in cabinetmaking, and in Fig. 6 the tongues 11 are distinctly T-shaped. In each of these shapes and in all others which embody the preferred principles of the invention, the tongues have wider outer portions and relatively narrow inner ends so as to enhance the tensile strength of the joint.

This tensile strength results from the interlocking connection provided by the interfit of the wider outer portions of the tongues in the inner wider portions of the grooves, with the tongues maintained in the plane of the grooves by the solidified coating substance overlying the interfitting edges and penetrating them, being there absorbed by the cut ends of the threads and bonding these ends together. The coating layer is not primarily relied on to produce tensile strength, but serves principally the function of maintaining the interfitted tongues in the single plane relation that is productive of the necessary degree of tensile strength.

It is found in actual practice that this strength is entirely adequate for all purposes to which the strip material is put. In actual use of a finished article embodying the strip, no appreciable tension is applied to it. However, tension is applied when the strip is being handled prior to fabrication into the ultimate article or prior to application to final position. Thus, pull is exerted on the strip when it is wound into rolls or onto spools, and pulling is applied also when the strip is being run through folding and sewing machines and other operations by which it is fabricated into a welt, gimp, binding or the like. Again, the finished device incorporating the strip may be subjected to manual tension by the individual operator or the machine in the operation of applying it to a final position in an automobile body, on an article of furniture, or elsewhere. The bonds produced by the novel splice joint provided by the present invention as hereinabove described have been found adequately strong to resist separation in all the foregoing tensioning operations. Once applied to final position, the joints lie flat and are not subject to any stresses that would tend to cause them to separate.

I claim:

1. A strip of coated fabric of indefinite length and relatively narrow width having a bias woven textile base comprising a plurality of sections arranged end to end and connected by joints each extending oblique-angularly across the strip and comprising the two end margins of the two adjacent sections each cut to provide a line of alternate flat tongues and complemental grooves, with the outer portions of the tongues being wider than the inner portions thereof and with the tongues of each of said sections snugly interfitted in and wholly enclosed by the grooves of the other in interlocking relation, and with a single coating covering said base, including portions penetrating said joints and covering and concealing the same, said coating being continuous throughout the length of the strip and consisting of solidified plastic and cooperating with said interfitted tongues and grooves to form the sole connection joining said sections.

2. A strip of coated fabric of indefinite length and relatively narrow width having a bias woven textile base comprising a plurality of sections arranged end to end and connected by joints each extending oblique-angularly across the strip and comprising the two end margins of the two adjacent sections each cut to provide a line of alternate flat tongues and complemental grooves, with the outer portions of the tongues being wider than the inner portions thereof and with the tongues of each of said sections snugly interfitted in and wholly enclosed by the grooves of the other in interlocking relation, and with a single grained coating covering said base, including portions penetrating said joints and covering the same and grained similarly to the portions of the coating between the joints whereby the joints are concealed, said coating being continuous throughout the length of the strip and consisting of solidified plastic and cooperating with said interfitted tongues and grooves to form the sole connection joining said sections.

References Cited in the file of this patent

UNITED STATES PATENTS

| | | |
|---|---|---|
| 298,095 | Kleinert | May 6, 1884 |
| 896,600 | Thornton | Aug. 18, 1908 |
| 1,148,584 | Gerrish | Aug. 3, 1915 |
| 1,474,774 | Fuller | Nov. 20, 1923 |
| 2,311,766 | Lumbard | Feb. 23, 1943 |
| 2,461,859 | Vasselli | Feb. 15, 1949 |
| 2,506,915 | Bishop | May 9, 1950 |
| 2,547,220 | Merrill | Apr. 3, 1951 |

FOREIGN PATENTS

| | | |
|---|---|---|
| 319,416 | Great Britain | Sept. 26, 1929 |
| 153,751 | Germany | July 11, 1938 |